March 10, 1970     M. LONG     3,499,475
SPIRAL MEAT CUBER

Filed Feb. 9, 1968     3 Sheets-Sheet 1

INVENTOR
Marshall Long

BY
ATTORNEYS

March 10, 1970    M. LONG    3,499,475
SPIRAL MEAT CUBER

Filed Feb. 9, 1968    3 Sheets-Sheet 2

INVENTOR
Marshall Long

BY Schmidt, Johnson, Hovey,
Williams & Bradley
ATTORNEYS

March 10, 1970  M. LONG  3,499,475
SPIRAL MEAT CUBER

Filed Feb. 9, 1968  3 Sheets-Sheet 3

INVENTOR
Marshall Long

BY Schmidt, Johnson, Hovey
Williams & Bradley
ATTORNEYS 3,499,475
SPIRAL MEAT CUBER
Marshall Long, Leawood, Kans. assignor to Marlen Equipment Company, Overland Park, Kans., a corporation of Kansas
Filed Feb. 9, 1968, Ser. No. 704,352
Int. Cl. B02c 18/06, 7/10
U.S. Cl. 146—95                                    10 Claims

ABSTRACT OF THE DISCLOSURE

Meat is advanced between and by an endless conveyor and an endless retainer and is severed during advancement by a frusto-conical, helical knife whose axis of rotation is parallel with both the upper meat supporting lap of the conveyor and the lower meat engaging stretch of the coveyor, such axis being inclined relative to the path of travel of the meat. Progressively deeper cuts, normal to such path of travel are made in the meat during each revolution of the knife until complete severance; and the weight of the swingable retainer unit tightly presses the meat downwardly against the conveyor. The convolutions of the knife depend through the retainer between the spaced, transverse stripper rods thereof; the larger convolutions not only project across the space between the conveyor and the retainer, but extend through the conveyor between the spaced, transverse meat supporting rods of the conveyor; and lugs on the conveyor rods hold the meat against lateral displacement.

---

An important object of the present invention is to provide a machine which will effectively cut frozen meat, solving the problems of knife gumming, clogging and losses which result from damage to the meat and to the cutting equipment.

Another important object of the instant invention is the provision of a meat cuber which simplifies the cutting operation and produces better cuts without periodic shutdown for cleaning and repair by virtue of progressively deeper cuts in the meat until complete severance is effected.

Still another important object of my present invention is the provision of a knife that is not only novel in its configuration, but in its disposition, making possible the advantageous type of gradual cutting operation above mentioned.

A further important object of the instant invention is to provide a combination press or retainer for the meat and a stripper for the knife, operable additionally as means co-operable with the conveyor for advancing the meat continually past the rotating knife.

Figure 1:
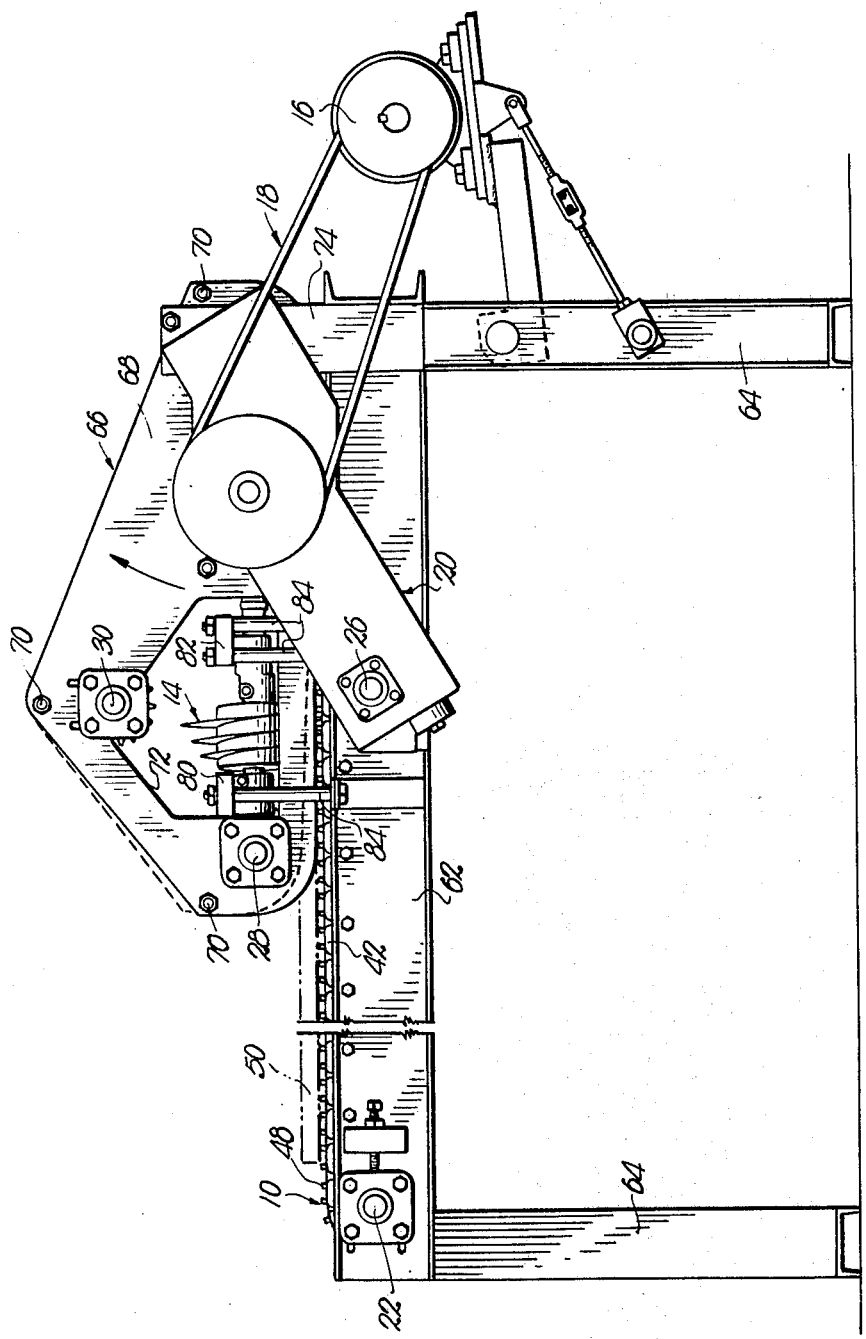
FIGURE 1 is a side elevational view of a spiral meat cuber made pursuant to my present invention.
Figure 2:
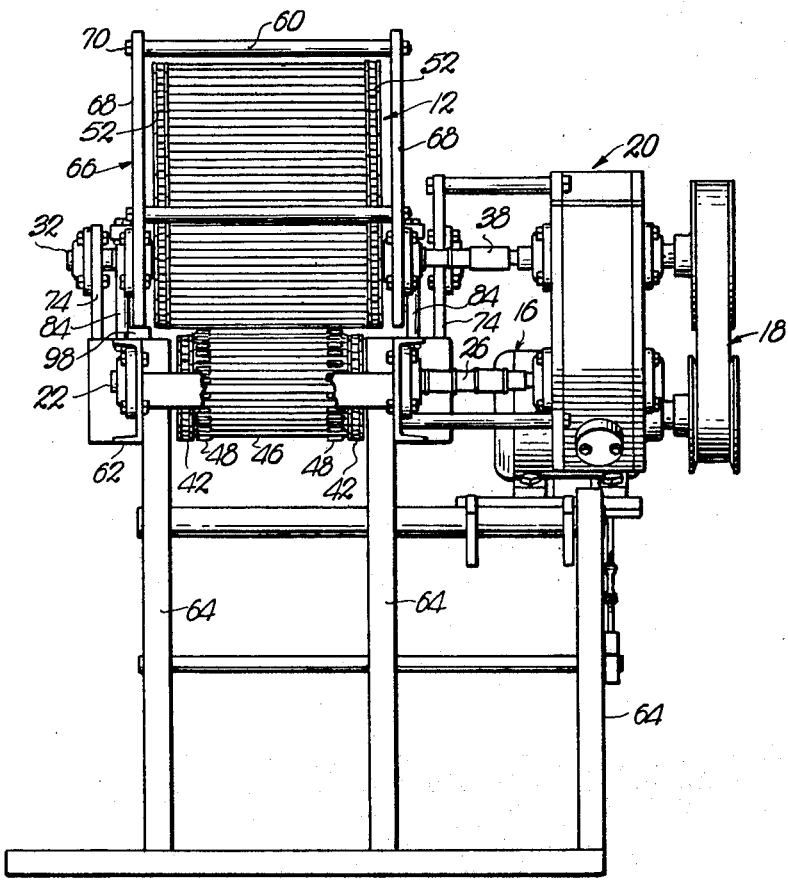
FIG. 2 is a front view thereof.

Endless conveyor 10, endless retainer 12 and frusto-conical, helical knife 14 are driven continuosly and in unison by a motor 16 through belt and pulley means 18 operably coupled with suitable gearing in a gear box 20. Conveyor 10 has a pair of spaced horizontal shafts 22 and 24, the latter of which is driven by output shaft 26 of gear box 20. Retainer 12 has three shafts 28, 30 and 32 in spaced, triangular arrangement parallel with shafts 22 and 24, shaft 32 being driven by output shaft 34 of gear box 20. Horizontal shaft 36 of knife 14 is driven by output shaft 38 of gear box 20 through a jackshaft 40.

Figure 4:
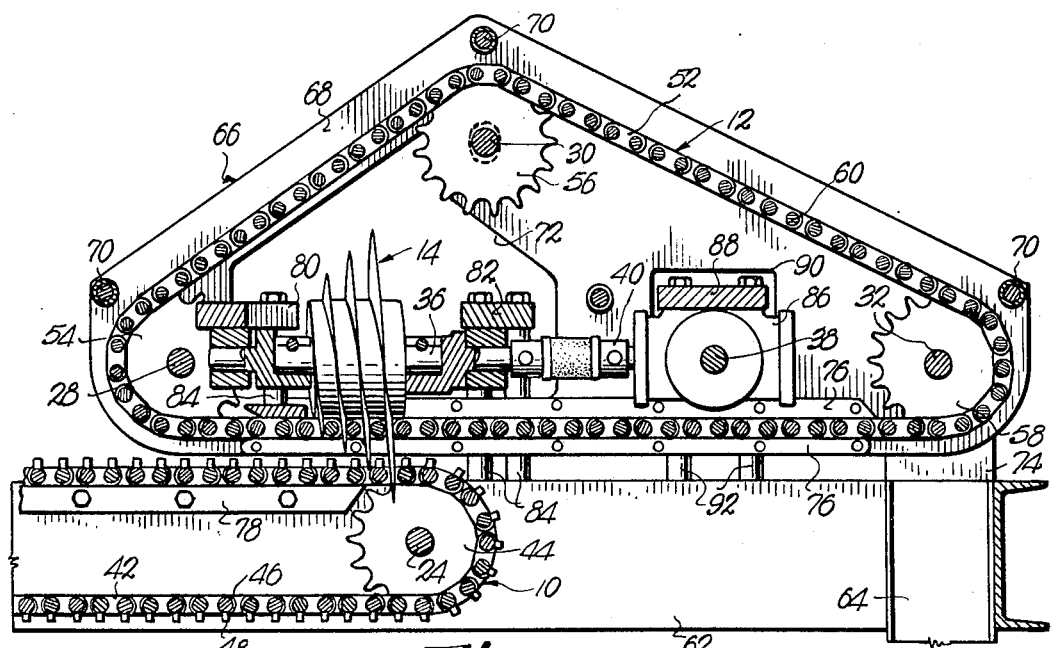
FIG. 4 is a fragmentary cross-sectional view taken on line 4—4 of FIG. 3.

Conveyor 10 includes two chains 42 each trained about sprocket wheels rigid to shafts 22 and 24, one being shown in FIG. 4 and designated 44. Transverse, spaced-apart, horizontal rod members 46, rigid to the links of chains 42, are each provided with a pair of spaced lugs 48 for retaining meat slab 50 against lateral displacement upon the upper lap of conveyor 10. Motor 16 drives such horizontal upper lap of conveyor 10 toward shaft 24, thereby advancing slab 50 rectilinearly toward knife 14.

Retainer 12 includes two chains 52 each trained about sprocket wheels rigid to shaft 28, 30 and 32, one for each such shaft being shown in FIG. 4 and designated 54, 56 and 58 respectively. Transverse, spaced-apart, horizontal rod elements 60 interconnect the links of chains 52 and engage the top of slab 50 resting on rods 46. Motor 16 drives retainer 12 at the same speed as conveyor 10, the horizontal lower stretch of retainer 12 is above a portion of conveyor 10 and parallel thereto, moving rectilinearly toward shaft 32.

Shafts 22 and 24 are carried by a frame 62 supported by legs 64, whereas shafts 28, 30 and 32 are supported by a carrier 66 which includes a pair of upright plates 68 interconnected by spacers 70 and provided with openings 72 through which knife 14 is adapted to pass for sharpening, repair or replacement. Carrier 66 is swingable on shaft 32 in turn supported by bars 74 extending upwardly from frame 62. A pair of guides 76 is provided on each plate 68 for each chain 52 and a guide 78 is provided on frame 62 for each chain 42.

The bearings for shafts 36 and 40 are supported by bars 80 and 82 which pass through openings 72 and are in turn supported by posts 84 on frame 62. Similarly, gear box 86 between shafts 38 and 40 is supported by bar 88 extending through openings 90 in plates 68, bar 88 being secured to posts 92 extending upwardly from frame 62.

Figures 5, 6:
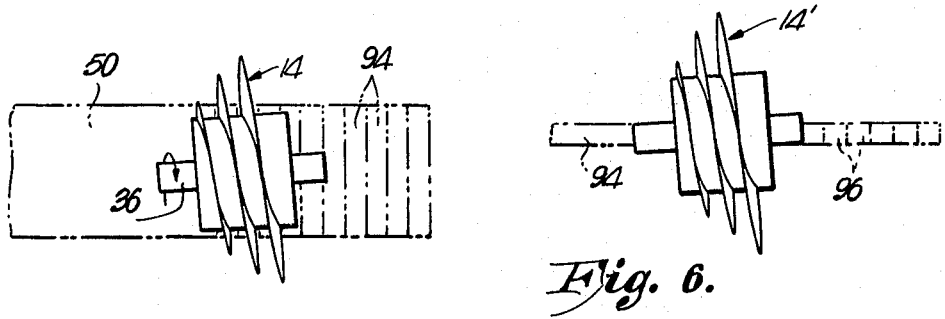
FIG. 5 is a plan view of the knife showing the strips cut thereby from a slab of meat.
FIG. 6 is a plan view of the knife showing the cubes cut thereby from the strips of meat.
Figure 3:
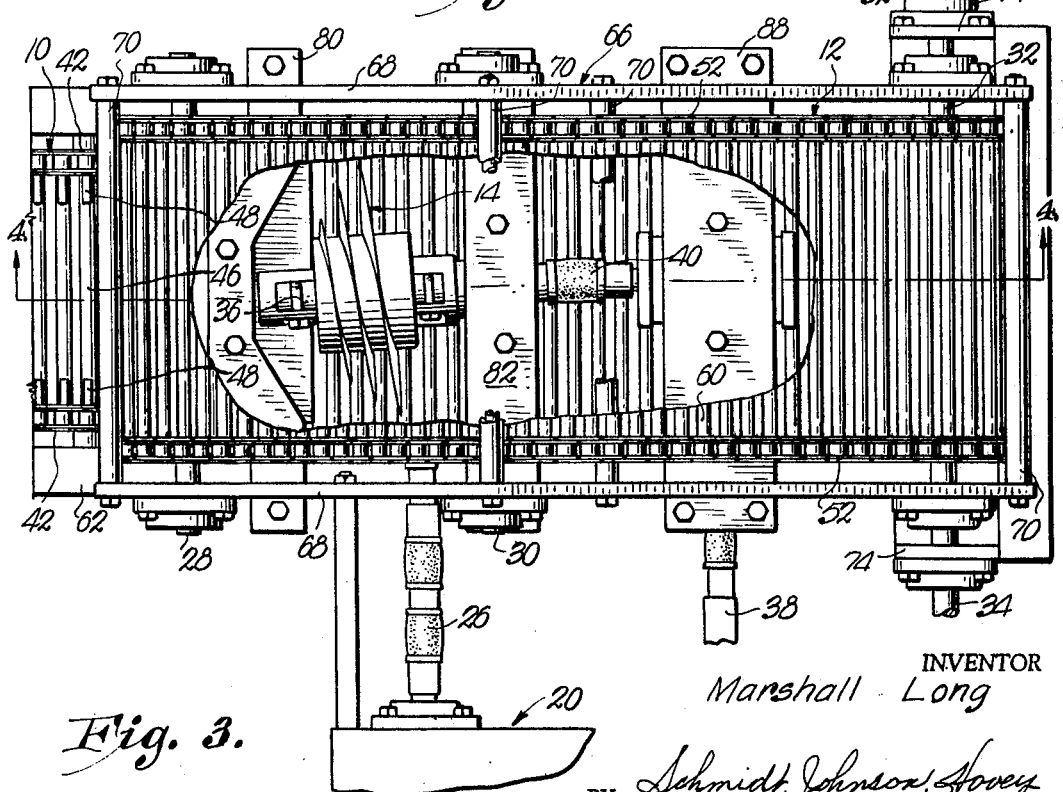
FIG. 3 is an enlarged, fragmentary top plan view thereof, parts being broken away for clearness.

Shaft 36 is inclined relative to the path of slab 50 (FIG. 3) and is timed so that the convolutions of knife 14 extend through retainer 12 between rods 60, such inclination assuring equally spaced, parallel, progressively deeper lines of cut by the knife convolutions until the largest convolution effects severance after one complete revolution in identical, elongated strips 94 (FIG. 5). The strips 94 emanating from conveyor 10 may be collected by suitable structure (not shown) below retainer 12 and transferred thereby to another machine of the kind above described wherein its knife 14' cuts the strips 94 into cubes 96. One or more strips 94 may be fed to knife 14' at the same time as desired. While all of the convolutions of knife 14 project into the space occupied by slab 50, only the large diameter convolutions extend through conveyor 10 between rods 46.

The weight of carrier 68 and meat retainer 12 thereon, limited by stop 98 on frame 62 beneath one plate 68, presses slab 50 against conveyor 10 and aids the latter in advancing the meat. The rods 60, and to some extent, the rods 46, operate to continuously strip the meat from the knife 14.

It can also be appreciated that the meat can be cubed by using a single machine. For example, a slab of frozen beef that is approximately 1" thick by 6" wide and 20" long may be first passed through the machine to slice the slab into strips which are 1" thick by 1" wide and 6" long. The strips may then be passed through the same machine to slice them into 1" cubes.

Having thus described the invention, what is claimed as new and desired to be secured by Letters Patent is:

1. A meat cuber comprising:
   an endless conveyor having an upper, meat supporting lap movable in one direction along a horizontal path of travel;
   an endless meat engaging retainer having a lower stretch, movable in said one direction along a horizontal path spaced above said lap, and provided with a number of spaced apart, transverse elements;
   a helical knife rotatable about a horizontal axis spaced above said stretch; and
   power means coupled with the conveyor, the retainer and the knife for driving the same in unison,
   the convolutions of said knife extending through the spaces between the elements into knife stripping relationship to said elements, and projecting below said stretch into cutting relationship to meat being advanced in said one direction by the conveyor and the retainer therebetween.

2. A meat cuber as claimed in claim 1,
   said conveyor having means holding the meat against lateral displacement on said lap.

3. A meat cuber as claimed in claim 1; and
   means yieldably holding the elements pressed tightly against said meat.

4. A meat cuber as claimed in claim 1;
   a carrier for said retainer; and
   means supporting said carrier for swinging movement about an axis parallel with said elements for swinging movement toward and away from the conveyor whereby the elements are yieldably pressed tightly against said meat.

5. A meat cuber as claimed in claim 1,
   said knife being frusto-conical whereby the same cuts progressively deeper transverse grooves in the meat as the latter is advanced until severance is effected through the meat during each revolution of the knife.

6. A meat cuber as claimed in claim 5,
   said axis of the knife being inclined relative to said paths of travel whereby said grooves are normal to said paths.

7. A meat cuber as claimed in claim 5,
   said conveyor being provided with a plurality of spaced apart, transverse members,
   certain of said convolutions extending through the spaces between said members,
   said power means driving the conveyor and the stripper at equal speeds.

8. A meat cuber as claimed in claim 7, each member having lug means at each end respectively thereof holding the meat against lateral displacement on said lap.

9. A meat cuber as claimed in claim 8;
   a carrier for said retainer; and
   means supporting said carrier for swinging movement about an axis parallel with said elements for swinging movement toward and away from the conveyor whereby the elements are yieldably pressed tightly against said meat.

10. A meat cuber as claimed in claim 9,
    said axis of the knife being inclined relative to said paths of travel whereby said grooves are normal to said paths.

References Cited

UNITED STATES PATENTS

| 149,640   | 4/1874  | Cluney et al. | 146—110 |
| 1,510,729 | 10/1924 | Weisner       | 146—95  |
| 1,909,029 | 5/1933  | Walter        | 146—95  |
| 2,107,002 | 2/1938  | Jensen et al. | 146—95  |

W. GRAYDON ABERCROMBIE, Primary Examiner

U.S. Cl. X.R.

146—110